April 14, 1953     W. P. SCHMITTER     2,634,686
PUMP MOUNTING AND DRIVE
Filed Jan. 28, 1949     2 SHEETS—SHEET 1
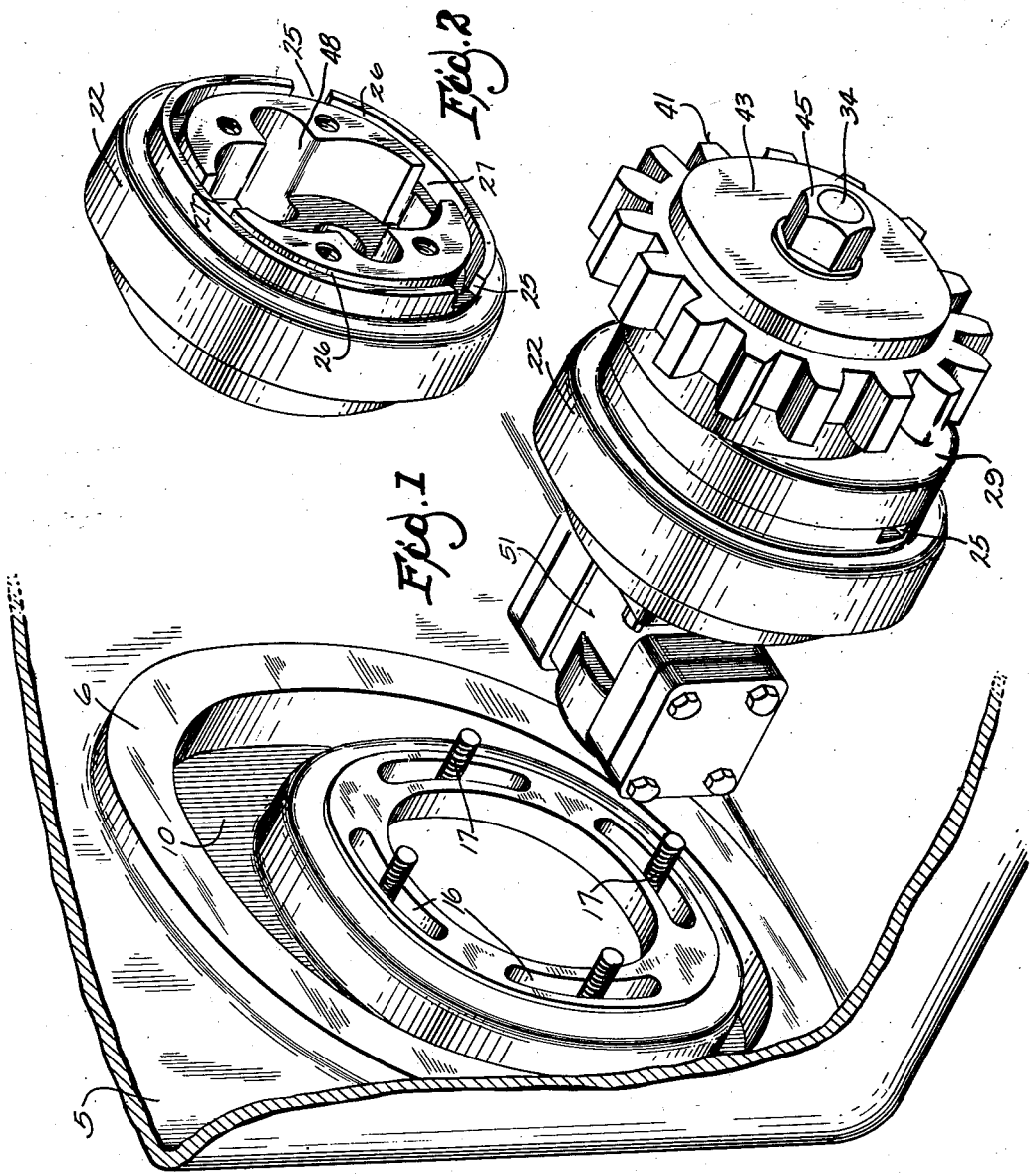
Inventor
WALTER P. SCHMITTER
By Miles Henninger
Attorney

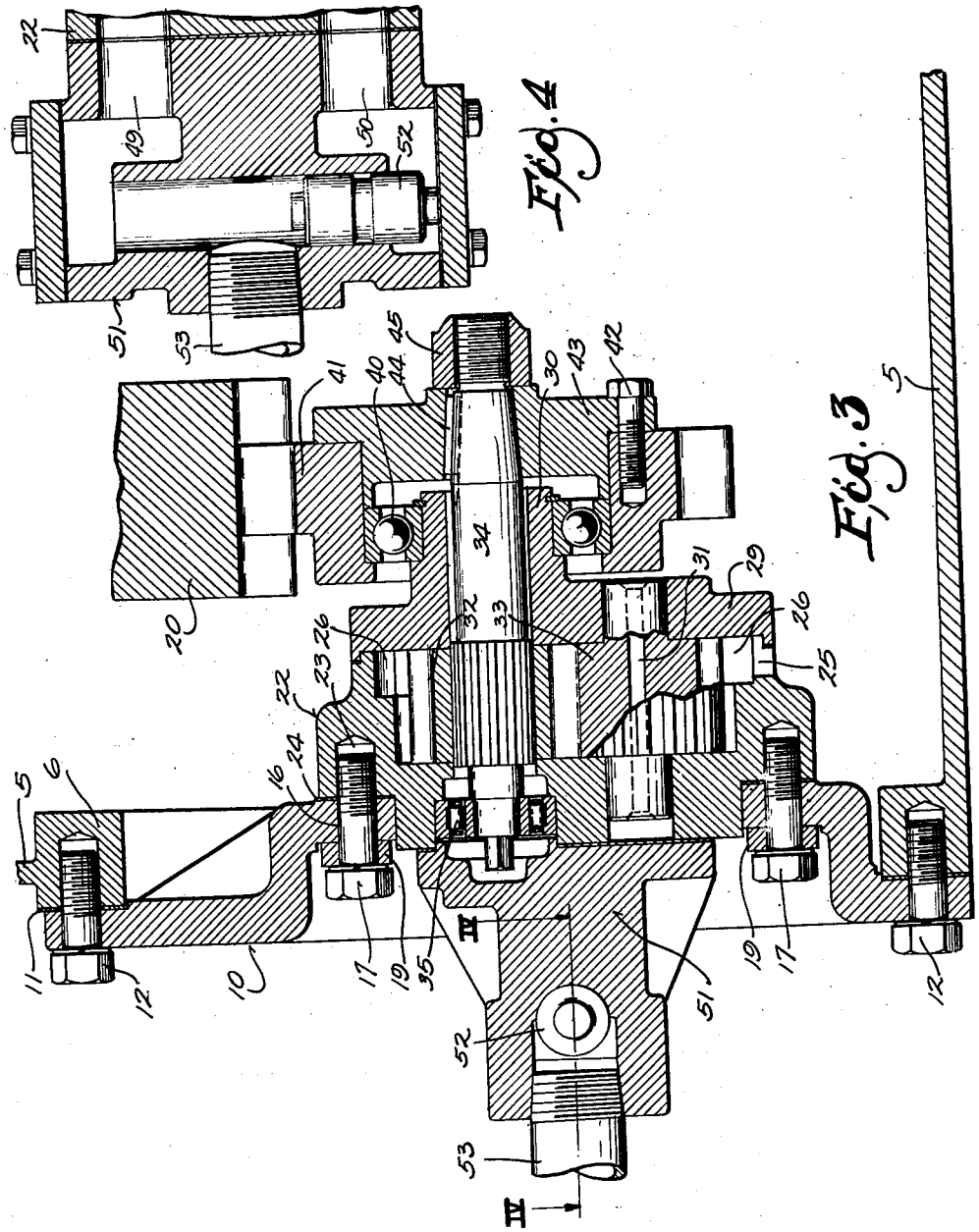

Patented Apr. 14, 1953

2,634,686

UNITED STATES PATENT OFFICE 2,634,686

PUMP MOUNTING AND DRIVE

Walter Paul Schmitter, Milwaukee, Wis., assignor to The Falk Corporation, Milwaukee, Wis., a corporation of Wisconsin Application January 28, 1949, Serial No. 73,287

11 Claims. (Cl. 103—126)

This invention relates to improvements in pumps and particularly to a pump for use in lubricant circulating systems of gear sets and in which the pump is to be driven by a gear of such sets.

The lubricant in gear sets is frequently circulated by a pump driven from a gear of the gear train. The particular gear driving such pump varies in size and speed in different gear sets, but the pump gear should be meshed with such gears in substantially the same manner to maintain a given pump impeller speed, for efficient pump operation. It has, accordingly, been necessary to provide different lubricating circulating pumps to permit operation thereof from the similarly placed gear of a number of gear sets with different transmission ratios.

It is, therefore, an object of the invention to provide a mounting for placing a lubricant circulating pump in any one of a number of different positions in a housing from or in which the lubricant is to be circulated.

Another object of the invention is to provide a lubricant circulating pump and mounting means therefor which is adapted for use with and for operation from any one of a number of gear trains within a considerable range of sizes of the gear of the train from which the pump is driven.

Another object of the invention is to provide a lubricant circulating pump which is to be driven from a power transmitting gear train, and in which misalignment of the rotating pump parts and axial thrust on such parts is avoided.

Objects and advantages other than those above set forth will be apparent from the following description when read in connection with the accompanying drawing illustrating one embodiment of the invention and in which:

Fig. 1 is an "exploded" perspective view of a fragment of a housing, and of means for mounting a lubricant circulating pump therein in a number of different positions;

Fig. 2 is a perspective view of the block in which the rotating elements operate for pumping the lubricant.

Fig. 3 is a cross-sectional view substantially axially of the pump and mounting means for the same, shown in perspective in Fig. 1; and Fig. 4 is a cross-sectional view, on the plane of line IV—IV of Fig. 3, of a valve mechanism associated with the pump.

Referring to the drawings in which like numerals refer to like parts, 5 designates a wall of a power transmitting gear set housing having an aperture therethrough defined by a ring or ring-like flange 6 with threaded holes therein. A plate 10 is adapted to be mounted in liquid-tight relation in the housing wall aperture as by a gasket 11 and studs 12 threaded into the bores in ring 6. Plate 10 is eccentrically recessed and has a circular aperture in the recessed portion with arcuate holes or slots 16 formed about the periphery of the plate aperture and concentrically with the aperture. Cap screws 17 extend through the slots and a ring 19 is seated on the plate for closing the slots and to distribute the pressure of the studs 17 about the periphery of the plate aperture.

A lubricant circulating pump is adapted to be adjustably positioned in the plate aperture and to be driven by one of the gears of a gear train, a fragment of such gear being shown at 20. The pump comprises a recessed block 22 with peripheral holes 23 into which cap screws 17 may be threaded, to hold a substantially circular block portion in fitting relation in the plate aperture with a shoulder of the block extending over the plate slots and seated on a gasket 24 for sealing the joint between the plate and the pump block in liquid-tight relation. By reference to Fig. 2 particularly, it will be seen that the pump block 22 has inlet ports 25 into a circumferential channel 26 with ports 27 for the flow of oil from the channel into the spaces for receiving the pump rotor elements. The inlet ports 25 are so located as to be well below the surface of the lubricant in the gear train housing when the pump is in desired position. The ports 27 are placed on a diameter of the pump block so that the pump rotor will be equally supplied with oil regardless of the direction of rotation thereof. In tests, it was found that the several ports and the channel should be so dimensioned that the rotor will be supplied with oil with the minimum disturbance in the oil flow conditions through the channel and into the rotor, to obtain a quietly-operating pump. To secure such pump operation, the direction of flow in the channel 26 should be substantially tangential to the rotor periphery and the velocity of flow should be substantially equal to the average pitchline velocity of the oil receiving portions of the rotor elements. The recess in the pump block is closed by a cover plate 29, having a circular boss or portion 30 extending therefrom eccentrically relative to axis of the pump block.

The pump rotor comprises a pair of meshing gears 32 and 33 which may be either spur or single helical gears and which are shown as spur gears only for ease in illustration. Gear 33 has an integral shaft journalled in apertures in the pump block and the cover and lubricated by oil passing through a bore 31 in the gear shaft. Gear 32 is however splined on a separate shaft 34 having one end mounted in a roller bearing 35 and having the other end thereof extending axially through the portion 30 of the pump housing cover. The splining of gear 32 and shaft 34 avoids the possibility of imposing axial forces on such gear if the shaft 34 is axially shifted and thus avoids improper meshing or binding of the pump rotor gears 32, 33 because of such forces. It will be seen that the center line of shaft 34 is offset from the center line of the pump block by a considerable distance so that the shaft center line may be shifted to a considerable extent by rotating the pump block about its center line.

A ball bearing 40 is mounted on the pump cover plate extension 30 for directly supporting a gear 41 fixed by capscrews 42 on a flanged collar 43 which is removably fixed on the shaft 34 by a key 44 and a nut 45. The gear 41 is designed to mesh with gear 20 of a gear train which is to be enclosed in the housing 5. The gears 20 and 41 are also shown as spur gears but may be helical gears, and gear 20 may even be a double helical gear with the gear 41 meshing with only one of the sets of teeth on gear 20.

The pump block 25 is provided with suitable passages 48 into which lubricant is pressed by rotation of the gears 32, 33 in either direction of rotation and from which the lubricant flows through passages 49 and 50 into a housing 51 containing a piston type valve body 52 shifted by the lubricant pressures in the passages. The lubricant pressures so act on the valve 52 as to reciprocate the valve dependent on the direction of rotation of the pump gears to direct flow of lubricant into a conduit 53 regardless of the direction of rotation of the pump gears.

In use of the present construction with a given gear set, the pump is inserted in the aperture in housing plate 10 and capscrews 17 are threaded into the pump block holes 26 and drawn up sufficiently to hold the pump body loosely in the plate. The pump block is then rotated about its center line to bring the pump driving gear 41 toward a position for proper meshing with gear 20 of the gear train, the offset of the shaft 34 being such that a material variation in position of gear 41 is possible. As soon as the gear 41 and the train gear 20 are in mesh, the capscrews 17 are drawn up tight and the conduit 51 is connected to the point to which lubricant under pressure is to be supplied.

The pump may be used with gear trains of which gear 20 varies in size and hence in peripheral speed, without change of the pump gear 41. Change in size of gear 20, of course, may require greater change in spacing of the center line of pump gear 41 relative to the train gear 20 than is possible by the above described pump shifting, to obtain proper meshing of the gears. Such greater change in spacing is obtained by change of position of plate 10 in housing 5 to bring pump gear 41 to approximately the proper position, and by thereafter shifting the pump in the plate aperture to bring the pump gear 41 to the final desired position. Such greater shifting in the pump position thus takes place in two steps, a coarse adjustment being made by shifting the plate in the housing wall and a fine adjustment being made by shifting the pump in the plate. It will thus be seen that a standard pump may be properly meshed with a gear of any one of a number of gear trains to be enclosed within a standard housing with gears of various sizes in a power transmission train. Gear 41 may be readily changed to obtain the pump speed for most efficient pump operation, regardless of the speed of train gear 20.

In the pump itself, the placing of a relatively large bearing for the pump rotor drive shaft, on the exterior of the pump housing adjacent the end of the shaft and adjacent to the pump driving gear, reduces the possibility of axial or radial displacements of the pump driving shaft which would affect the relationship of the pump rotor gears with one another and with the pump block and cover.

Although but one embodiment of the present invention has been illustrated and described, it will be apparent that various changes and modifications may be made therein without departing from the invention as defined in the appended claims.

I claim:

1. In combination with a gear train, a housing for enclosing the gear train and having an aperture therein, a plate for closing the housing aperture and having an aperture therein, and a pump mounted in the plate aperture and including a driving gear adapted to be meshed with a gear of the gear train, the plate being mounted in the housing aperture for adjustment to bring the driving gear of the pump into mesh with a gear of the gear train.

2. In combination with a gear train, a housing for enclosing the gear train and having a circular aperture therein, a plate for closing the housing aperture and having a circular aperture eccentrically therethrough relative to the plate center, and a pump mounted in the plate aperture and including a driving gear adapted to be meshed with a gear of the gear train, the plate being mounted in the housing aperture for adjustment to bring the driving gear of the pump into mesh with a gear of the gear train.

3. In combination with a gear train, a housing for enclosing the gear train and having an aperture therein, a plate for closing the housing aperture and having an aperture therein, and a pump including a block, a shaft eccentrically of the block, and a gear on the shaft, the pump being adjustable in the plate aperture to bring the pump gear into mesh with a gear of the gear train.

4. In combination with a gear train, a housing for enclosing the gear train and having a circular aperture therein, a plate for closing the housing aperture and having a circular aperture eccentrically therethrough relative to the plate center, and a pump including a block, a shaft eccentrically of the block, and a gear on the shaft, the pump being adjustable in the plate aperture to bring the pump gear into mesh with a gear of the gear train.

5. In combination with power transmission gearing, a housing for enclosing the gearing and having an aperture therein, a plate for closing the housing aperture and having a circular opening eccentrically therethrough relative to the plate center, the plate having arcuate slots formed adjacent the periphery of the plate aperture, and a pump including a driving gear adapted to be meshed with the gearing, a pump casing block rotatably supporting the driving gear and fitted into the plate aperture for movement therein to bring the pump driving gear into mesh with a gear of the power transmission gearing, and studs extending through the slots into the pump block for holding the pump in adjusted position.

6. In combination with a gear train, a housing for enclosing a gear train and having a circular aperture therein, a plate for closing the housing aperture and having a circular aperture eccentrically therethrough relative to the plate center, the plate being rotatably adjustable in the housing aperture, and a pump including a circular body extending through the plate aperture and a driving gear displaced in a radial direction from the axis of the pump, the pump being rotatably adjustable in the plate aperture, adjustment of the plate in the housing and of the pump in the plate bringing the pump drive gear into mesh with a gear of the gear train.

7. In combination with a gear train, a housing for enclosing a gear train and having a circular aperture therein, a plate for closing the housing aperture and having a circular aperture eccentrically therethrough relative to the plate center, the plate being rotatably adjustable in the housing aperture and having arcuate slots formed adjacent the periphery of the plate aperture, and a pump including a circular body extending through the plate aperture and a driving gear displaced in a radial direction from the axis of the pump, the pump being rotatably adjustable in the plate aperture, adjustment of the plate in the housing and of the pump in the plate bringing the pump drive gear into mesh with a gear of the gear train, the pump having a shoulder seating over and closing the slots, a ring seating on the plate over the slots, and studs extending through the ring and the plate slots and into the pump body for holding the pump in adjusted position in the plate aperture.

8. In a pump to be driven by a gear train, a pump housing, a pump rotor enclosed within the housing, a drive shaft for the rotor and extending from the housing, a gear on the extending end of the shaft for meshing with a gear of the gear train for driving the pump rotor, and a bearing for the shaft, the bearing being located on the pump housing and inside the pump drive gear.

9. In a lubricant pump to be driven by power transmitting gearing, a pump housing, a pump rotor enclosed within the housing, a drive shaft for the rotor and extending from the housing, a collar fixed on the extending end of the shaft, a gear fixed on the collar, and a bearing for the shaft, the bearing being located on the housing by the collar and the gear acting as a unit.

10. In a lubricant pump to be driven by a power transmitting gear train, a pump housing, a pump rotor enclosed within the housing, a drive shaft for the rotor and extending from the housing, a collar fixed on the extending end of the shaft, a gear fixed on the collar, the collar and the gear coacting as a unit and extending re-entrantly over portions of the end of the housing and of the shaft and a bearing mounted externally on the housing and within the space defined by coaction of the gear and the collar with the housing.

11. In a lubricant pump to be driven by a power transmitting gear train enclosed within a housing, a pump inside the gear train housing, the pump including a cover with a boss extending a substantial distance into the gear train housing, a rotor within the pump housing, a drive shaft for the rotor and extending through the boss from the pump housing, a collar fixed on the end of the shaft and re-entrant over the shaft and the cover boss, a gear fixed on the collar, and a bearing for the shaft and the gear, the bearing being mounted externally on the cover boss and in the space defined by the collar and the gear and the cover boss.

WALTER PAUL SCHMITTER.

References Cited in the file of this patent

UNITED STATES PATENTS

| Number | Name | Date |
|---|---|---|
| 1,225,102 | Banks | May 8, 1917 |
| 1,362,621 | Hawley | Dec. 21, 1920 |
| 1,478,417 | Wottring et al. | Dec. 25, 1923 |
| 1,626,115 | Egersdorfer | Apr. 26, 1927 |
| 1,785,386 | McIntyre | Dec. 16, 1930 |
| 1,880,108 | Ross | Sept. 27, 1932 |
| 1,897,560 | Lawser | Feb. 14, 1933 |
| 2,103,096 | Sherwood | Dec. 21, 1937 |
| 2,347,580 | Stearns | Apr. 25, 1944 |
| 2,436,746 | Drought | Feb. 24, 1948 |
| 2,437,314 | Berndtson | Mar. 9, 1948 |

FOREIGN PATENTS

| Number | Country | Date |
|---|---|---|
| 215,281 | Great Britain | May 8, 1924 |